(No Model.) 3 Sheets—Sheet 1.

E. W. BINGHAM.
SECTIONAL HORSESHOE.

No. 372,652. Patented Nov. 8, 1887.

WITNESSES
Phil C. Dietrich.
F. F. F. Johnson.

INVENTOR
E. W. Bingham.
by:
E. Everett Ellis
Attorney (No Model.) 3 Sheets—Sheet 2.
E. W. BINGHAM.
SECTIONAL HORSESHOE.
No. 372,652. Patented Nov. 8, 1887.
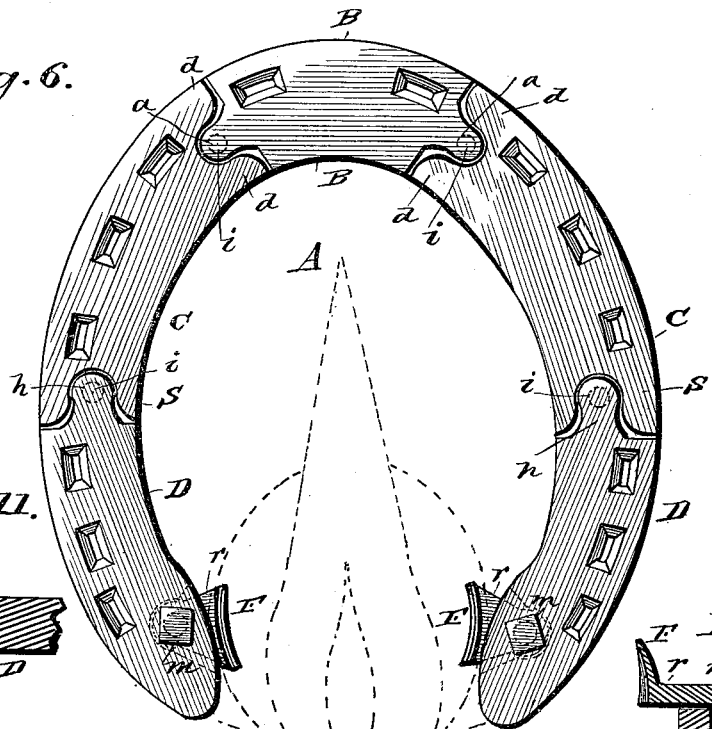
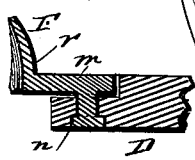
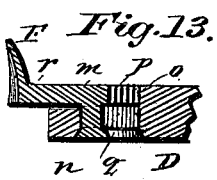
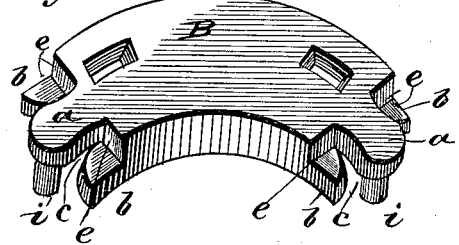
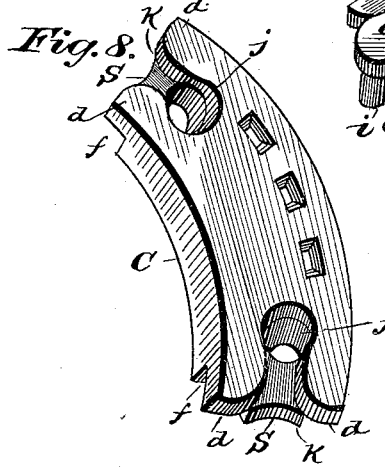
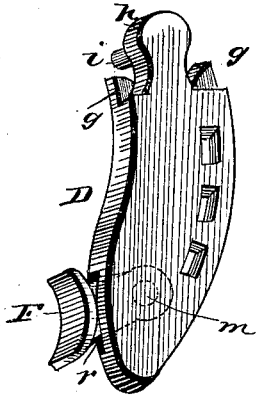
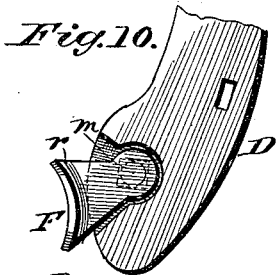
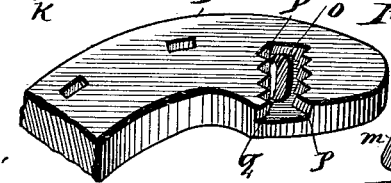
WITNESSES
Phil. C. Dieterich,
F. F. Johnson,
INVENTOR
E. W. Bingham.
by:
E. Everitt Ellis
his Attorney (No Model.) 3 Sheets—Sheet 3.
E. W. BINGHAM.
SECTIONAL HORSESHOE.
No. 372,652. Patented Nov. 8, 1887.
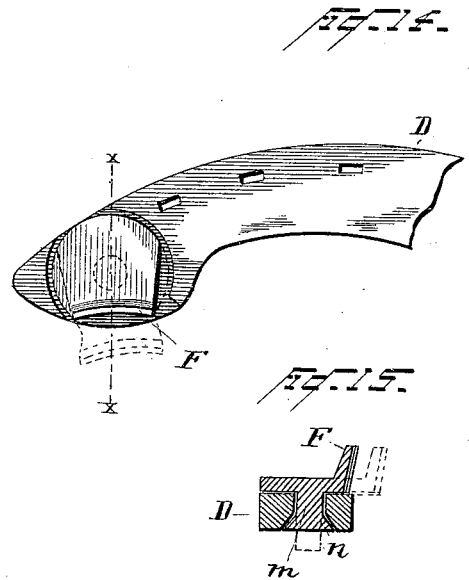
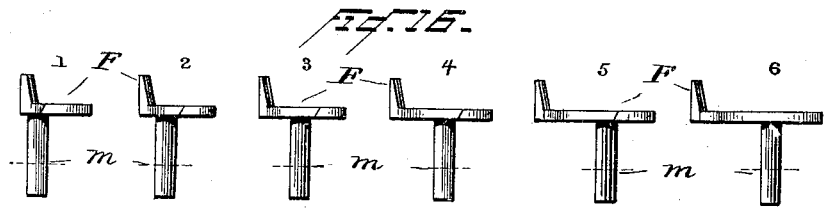
WITNESSES
Curtis Hammond
Jos. W. Deneane
Edward W. Bingham
INVENTOR
By E. Everett Ellis
his Attorney

UNITED STATES PATENT OFFICE.

EDWARD W. BINGHAM, OF PORTLAND, OREGON.

SECTIONAL HORSESHOE.

SPECIFICATION forming part of Letters Patent No. 372,652, dated November 8, 1887.

Application filed February 12, 1887. Serial No. 227,413. (No model.)

*To all whom it may concern:*

Be it known that I, EDWARD W. BINGHAM, a citizen of the United States, residing at Portland, in the county of Multnomah and State of Oregon, have invented certain new and useful Improvements in Sectional Horseshoes; and I do hereby declare the following to be a full, clear, and exact description of the invention, such as will enable others skilled in the art to which it appertains to make and use the same.

This invention relates to certain new and useful improvements in horseshoes; and it consists, substantially, in the same as constructed, and in such peculiar arrangements and combinations of parts, as will hereinafter be more particularly described, and pointed out in the claims.

The invention has more particular reference to sectional horse and mule shoes manufactured in accordance with United States Letters Patent No. 346,350, dated July 27, 1886, to John E. Bingham, wherein it is stated that the sections are manufactured in a series of different sizes and curves and interchangeable, and intended to be suitably combined, so as to accurately fit without having to reheat or bend the sections to conform to the shape of the hoof.

The object of the present invention is to facilitate the practice of the improved system of shoeing described in said patent by the use of a smaller assortment of sections, and to simplify the joint between the sections and provide for a ready adjustment and attachment of a bar-lug to any size or curve of heel-section, so as to suit any width of bar and permit the lug to enter the recess between the bar and frog of any foot, and by a firm bearing against the bar steady and support the heel-sections of the shoe.

Figure 1:
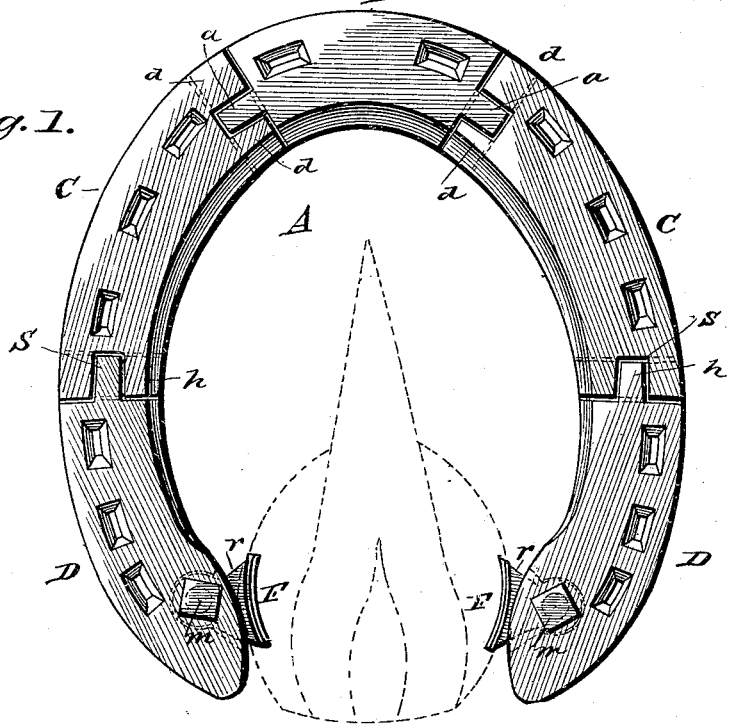
Figure 2:
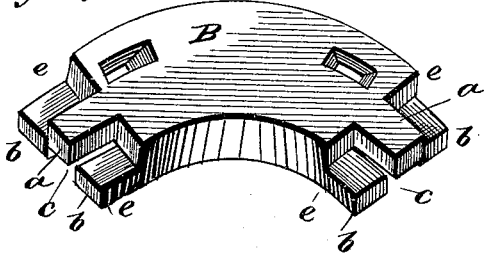
Figure 3:
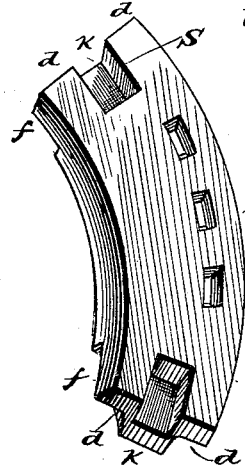
Figure 5:
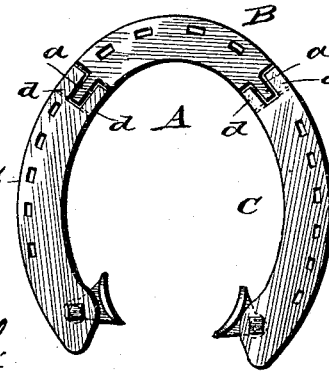
Figure 4:
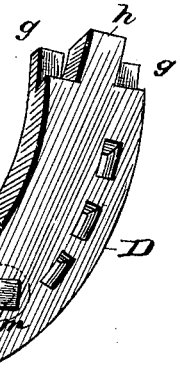

Figure 1 represents a plan view of the bottom or ground surface of a horseshoe embodying my improvements, the same also indicating in dotted lines the frog and bars of a horse's foot. Fig. 2 is a perspective view of the toe-section of the shoe; Fig. 3, a similar view of one of the side or middle sections; Fig. 4, a like view of one of the end or heel sections.
Fig. 5 represents a plan view of the ground-surface of the shoe as when made up of only three sections. Fig. 6 represents a plan view of the ground-surface of the shoe, indicating a modification of the joint whereby the sections may be riveted together. Fig. 7 is a perspective view of toe-section involving such modified form of joint, and by which the construction thereof is more clearly indicated. Fig. 8 is a perspective view of one of the side or middle sections of this modification, and Fig. 9 a like view of one of the end or heel sections. Fig. 10 is a view of a portion of one of the end or heel sections, showing the construction thereof on the hoof-surface and the attachment thereto of the movable lug for fitting over the bars of the foot. Fig. 11 is a sectional view of the heel portion, taken through this lug, showing the manner of securing it in position by upsetting the end of its rivet. Fig. 12 represents a modification in the manner of attaching the "bar-lug" to said heel-section, and Fig. 13 is a sectional view of this modification. Fig. 14 represents a plan view of a portion of heel-section of a shoe, showing the manner in which the bar-lugs may be turned to conform to bars of different shapes or curves, and also indicating in dotted lines how lugs of different sizes may be inserted to conform to bars of varying widths. Fig. 15 is a sectional view of Fig. 14 on the line $xx$. Fig. 16 is a view representing a set of lugs differing in size by the proper selection, from which not only may bars of different shapes or curves be accurately fitted, but also of different widths.

Reference being had to the several parts by the letters marked thereon, A represents as a whole a horseshoe embodying my invention made up, preferably, of five sections—that is, a toe-section, B, two middle or side sections, C C, and two end or heel sections, D D.

The ends of the toe-sections are cut out to form a tongue, $a$, that is flush with the ground-surface, and two similar tongues, $b\ b$, that are flush or even with the opposite or hoof surface, thus leaving a slot or recess, $c$, between the tongues $b\ b$ and directly beneath tongue $a$, and also leaving mortises $e\ e$ on opposite sides of said tongue $a$. The connecting ends of the side or middle sections with the toe-piece are formed with tongues $d\ d$ and $k$, fitting the two mortises $e\ e$ and $c$, and receiving the tongue $a$ into the slot or recess S, formed in said side section, the said tongues $d$ $d$ being slotted out from beneath, as at $f$, for the reception of tongues $b$ $b$ of the toe-piece. The connection of the end or heel sections with the middle or side sections is made in a similar manner, they being formed likewise with tongues $g$ $g$ and $h$.

The middle sections, C C, are alike and interchangeable by simply reversing ends. In practice I prefer to make this middle section of about six different lengths and about two different curves of each length, and of the toe-pieces about three different sizes, and of the heel-pieces about two different sizes of each. Thus there would be three toe-pieces, twelve side sections, and four heel-sections, or nineteen different pieces in all; but the side sections, C, being suitable for either the right or left sides, are the equivalent of twelve other pieces. With this small number of different shapes a great number of differently-shaped feet can be fitted without reheating or bending the sections. I have indicated in the drawings a large number of nail-holes; but ordinarily two nails in each section will suffice. It will thus be seen that a joint is obtained which allows the ready interchanging of the sections in fitting after the toe section is nailed on, and also allows ample movement of the sections in fitting hoofs of different sizes and curves, and allows the shoe to expand in all directions as the hoof grows and moves when in action, and at the same time the joint unites the several sections, so that they cannot separate laterally or vertically, and cannot twist inwardly or outwardly. In some instances I resort to the same style of joinder of the parts, but construct the shoe of three sections only, (see Fig. 5;) but I prefer in practice to employ the five sections above referred to, as thereby a smaller assortment of sizes and curves is required.

Figs. 6 to 9, inclusive, of the drawings represent a modification in the form of joint, whereby the different sections may be riveted together, and wherein, instead of forming the tongues and recesses of the several parts of angular outline, I form them correspondingly rounded or oval. For particular kinds of work—as for draft-horses and when shoes with calks are required—I prefer to pivotally or movably connect the sections by means of a rivet, $i$, formed on the tongue $a$, and fitting into corresponding openings, $j$, in the opposite section. Instead of forming the rivets with the parts themselves, I may provide a hole through each section and employ separate rivets; but in practice I prefer casting or forging the rivets as an integral part.

In a pending application of John E. Bingham, filed December 16, 1886, and bearing serial number 221,704, a lug is shown and described which is formed integral with the side section projecting from the hoof-surface of the shoe near the heel, and intended to fit within the natural cleft between the bars and frog of a horse's foot. In the application referred to, the purpose of these lugs has been clearly set forth, and which purpose may be briefly stated as being to relieve the securing-nails from the strain caused by retraction of the parts of the hoof expanded by contact with the ground in traveling, and from outward strains caused by stepping on stones and uneven surfaces. In practicing the invention described in said application, Serial No. 221,704, I have found that for some feet the bar-lug is placed too far in from the outer rim of the shoe, while in other feet having wider bars or heels the lugs are not in far enough, and often when about the right distance in the lug is set at too much or too little of an angle or curve to fit the peculiarities of the foot to be shod. To be of service, the lug must press tightly against the bar when the shoe is nailed on, so that any strain tending to twist the heel part of the shoe off outwardly will not be thrown upon the nails near the heels, but will be sustained chiefly by the lug itself.

As an improvement upon the bar-lugs heretofore in use I combine with the plate Y, from which the lug indicated at F (see Figs. 11 and 13) projects, a pivotal pin, $m$, adapted to enter a hole, $n$, pierced through the heel-section of the shoe near its heel end, the function of this pin being, first, to serve as a pivot upon which the lug may be revolved to adapt it to the most effective contact with the inner face of the bar of the foot after the heel-section has been properly fitted thereto, and, second, to serve as a rivet, by means whereof, after the lug has been adjusted, it may be positively fixed in its effective position, so as to maintain the same, practically, as a part of the shoe, the pin being made fast as a rivet by being upset in the hole $n$ and headed thereon in the customary manner.

To facilitate the adjustment of a bar-lug to different widths of bars as found in different feet, I provide a series of these bar-lugs and plates, in which, severally, the lug F and the pivot-pin $m$ are at different distances apart, as shown in Fig. 16, so that by a selection from the series the exigencies of each particular foot may be readily met in this particular. The hole $n$ is squared or suitably countersunk at its outer end, so that the end of the pin or rivet, when upset therein, will be made fast and the lug fixed in the position in which it has been adjusted and set. As a modification of this feature of my invention, I would refer to Figs. 12 and 13, wherein I cut a slot, $o$, in the heel-section, the sides of which slot I preferably roughen, as at $p$, to keep the lug F from pulling out of the position it is desired to fix it in for fitting the bar. At $q$, I form an oblong hole countersunk around its lower sides for the reception of the upset or bent portion of the rivet. In this form the part $r$, connecting the lug F with the rivet $m$, may be swaged out into the roughenings $p$, and it may also be suitably bent to give the lug the desired curve for fitting the bar. It will be understood that in practice the farrier, after ascertaining the distance and curve, selects the proper sized lug, inserts the rivet in the hole provided for it in the heel-section, adjusts the lug to fit, and then bends over or upsets the end of the rivet, thus permanently fixing the lug in the position to exactly fit the peculiarities of the bar on the foot being shod. I have ascertained in practicing said inventions that the bars of horse's feet often vary very much where the hoofs are accurately fitted by heel-sections of the same size and curve; hence it will be seen that in the class of horseshoes designed to be ready made and finished in the factory and fitted without reheating or bending, this movable or adjustable bar-lug is very advantageous.

I am aware that various forms of shoes have been constructed for the purpose of expanding by mechanical means the heels of a horse's hoof and in which the devices are employed to take hold of the bar of the hoof on its inner side for the purpose of forcing the bars apart. An example of this class is found in the patent to W. C. Hubbard, No. 20,713. Hubbard's device consists of a solid, stiff, unyielding shoe made wider at the heel than at the hoof upon which it is to be used, and provided with hooks having shanks passing horizontally transversely through the thick heel part of the shoe, each receiving a nut on the outer end thereof. These hooks are made to catch into the inner side of the bar of the hoof, and being drawn tight by the nuts serve to create a powerful tension on the bar to draw and expand it outward. My invention differs from this expanding device, in that the bar-lug is attached to the shoe by means of a pivot-pin passing vertically transversely through the heel-section of the shoe, whereby the lug may be rotated for adjustment in a horizontal plane, and in that the lug when adjusted is fixed and held not only by the riveting of the pin, but also by the pressure of the bars against the heel-sections of the sectional shoe, which, because of its joint, would otherwise be liable to be twisted and wrenched off the foot. In A. L. Lincoln's Patent, No. 198,635, for an expanding shoe, two levers are pivoted to the two heel ends of a jointed horseshoe and centrally to each other to form a toggle-joint, which, being operated by a central screw bearing against the toe-piece and fitted with lugs to engage the inner side of the bar of the foot on each side, are made to force apart the ends of the horseshoe and with it the hoof. My invention differs therefrom, in that there are no levers or braces to spread the hoof, and that the lugs when adjusted are permanently and rigidly attached to the shoe, so as to form practically an integral portion thereof. In the patent to J. A. Risdon, No. 202,758, independent detachable heel-clips, having a flange projecting from one end thereof to fit into a groove in the heel of the shoe, are combined with a horseshoe for contracted hoofs, which is jointed and made to be spread apart at the heels by cam mechanism; but my invention differs from these heel-clips in that the lug-plates and lugs which I employ are secured by a pin serving as a pivot for their adjustment and thereafter as a rivet to secure and confine the lug, so that it shall be practically integral with the shoe. Furthermore, in all of said patents the functions of the lugs or clips differ wholly from that of the bar-lug in my invention, in that they are designed to force apart the bars of the hoof by tension exerted by means of the shoe, whereas my device is designed to stay and hold the shoe by means of the support which is obtained from the bar of the hoof, and is in brief an improved device for attaching the shoe to the hoof.

Having fully described my invention, what I desire to claim and secure by Letters Patent is—

1. The combination, with the heel-section of a sectional horseshoe, of a plate resting upon the hoof-surface thereof parallel therewith, a pin at right angles therewith serving as a pivot for its adjustment and as a rivet to secure it, and a lug projecting in the opposite direction from the opposite end of said plate, substantially in the manner and for the purpose herein set forth.

2. The combination, with each other, in a sectional horseshoe, of detachable sections, one section having a tongue, $a$, projecting centrally from one of its ends formed flush with the face of the section on the ground-surface and cut out on the hoof-surface to form the central recess, $c$, and having lateral tongues $b\ b$, projecting in like manner from the same end of the section, one on each side of said central tongue, $a$, each formed flush with the face of the section on the hoof side and cut out on the ground side to form the lateral recesses $e\ e$, and the approximating end of the other section formed reciprocally with a tongue, $k$, projecting centrally from the end of the section flush with the face of the section on the hoof side and cut out on the ground-surface to form the central recess, $s$, and having lateral tongues $d\ d$, projecting in like manner from the same end, one on each side of said central tongue, $k$, each formed flush with the face of the section on the ground side and cut out on the hoof side to form the lateral recesses $f\ f$, forming an interlocking joint between the two sections, substantially in the manner and for the purpose herein set forth.

3. The combination, with each other, in a sectional horseshoe, of detachable sections, each having a single tongue projecting centrally from one of its ends flush with one face thereof and of about half its thickness, and lateral tongues projecting in like manner from the same end on either side of said central tongue between the plane of its inner face and that of the opposite face of the section, the central tongues upon the approximating ends of the adjacent sections being respectively formed flush with the opposite faces of said sections, and having a pin passing transversely through them from the hoof-surface to the ground-surface to be upset and riveted therein to form a hinged interlocking joint between the two sections, substantially in the manner and for the purpose herein set forth.

4. The combination, with the toe and heel sections of a sectional horseshoe, of interposed central side sections, both adapted to fit interchangeably between either end of the toe-section and the corresponding heel-section, substantially in the manner and for the purpose herein set forth.

In testimony whereof I affix my signature in presence of two witnesses.

EDWARD W. BINGHAM.

Witnesses:
  JAMES SHEPARD,
  JOHN EDWARDS, Jr.